Reissued June 20, 1933

Re. 18,873

UNITED STATES PATENT OFFICE

ARTHUR R. MURPHY, OF PENNS GROVE, NEW JERSEY, AND JOSEPH B. OESCH, OF VIENNA, AUSTRIA, ASSIGNORS, BY MESNE ASSIGNMENTS, TO E. I. DU PONT DE NEMOURS & COMPANY, A CORPORATION OF DELAWARE

SULPHONATION OF AROMATIC AMINES

No Drawing. Original No. 1,794,861, dated March 3, 1931, Serial No. 247,254, filed January 16, 1928. Application for reissue filed March 17, 1933. Serial No. 661,352.

This invention relates to a method for the sulphonation of aromatic amines, whereby aromatic compounds are produced containing a sulphonic acid group in ortho position to the amino group.

In general, following the procedures of heretofore known methods of sulphonating aromatic amines results in the formation of mixtures of products and in many cases in considerable destruction of the original starting material. In fact, the direct sulphonation of amines in the usual manner does not lead to an ortho sulphonation to an extent sufficient to make the method practical. Recently there has been described a method whereby these desired products are obtained by the use of chloro sulphonic acid and a suitable solvent, but this method presents certain disadvantages.

It is therefore an object of our invention to provide a method for the preparation of the ortho sulphonic acid derivatives of aromatic amines having the position para to the amino group occupied by a radical or a portion of a radical other than a hydrogen atom in an economically practical manner, and thereby render easily available valuable starting materials for use in the preparation of other intermediates and dyestuffs.

Other and further important objects of this invention will become apparent from the following description and appended claims.

Our present method makes it possible to obtain ortho sulphonated amines in good yields, and comprises treating an aromatic amine having the position para to the amino group occupied by a radical or a portion of a radical other than a hydrogen atom with sulfur trioxide. The amino body is dissolved in a suitable dry organic solvent therefor, such as tetrachlorethane, carbon tetrachloride or the like, and subjected to treatment with sulphur trioxide. In order for the solvent to be suitable for the purpose set forth it must be inert and remain practically unattacked by the sulphur trioxide and its boiling point must be sufficiently high to permit the completion of the sulphonation by heating. In some cases, it is even possible to use an excess of the amino body as solvent, but this is not preferred. Ordinarily the reaction appears to proceed in two steps, accompanied in the first step by the separation of an intermediate compound, presumably the sulphuric acid ester of the original amine or an addition compound. The second step comprises the conversion of the compound first formed into the sulphonic acid derivative. In certain cases, the two steps appear to take place simultaneously if, in fact, two steps do take place.

The following chemical equation, using as an example meta xylidine, probably represents the ultimate chemical reaction taking place.

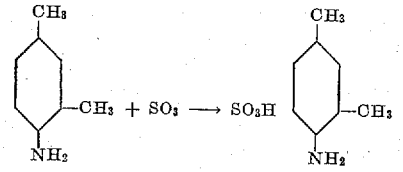

A consideration of the reaction given above demonstrates clearly one of the advantages of our present process over the heretofore described method using chloro sulphonic acid as the sulphonating agent. The use of chloro sulphonic acid is accompanied by the evolution of hydrochloric acid, which, on account of its highly corrosive nature, makes it necessary to employ certain precautionary measures in the design of apparatus to offset its corrosive effects. The evolution of hydrochloric acid gas also introduces certain complications, due to the fact that the hydrochloric acid evolved entrains some of the solvent, thus necessitating an additional recovery step which is accompanied with further losses of the solvent. It was therefore quite surprising to find that the ortho sulpho amines could be prepared directly from the para substituted amino body by the use of the simple reaction as outlined above and with such an easily available sulphonating agent as sulphur trioxide.

It is to be further noted that on account of the lower molecular weight of sulphur trioxide compared to chloro sulphonic acid and on account of its lower cost, sulphur trioxide possesses a great economical advantage as a sulphonating agent.

Without limiting our invention to any particular procedure the following examples, in which parts by weight are given, serve to illustrate the preferred form of our method.

*Example I*

One hundred twenty-one (121) parts of meta xylidine (1:3-di-methyl-4-amino-benzene) are added to 500 parts of tetrachlorethane. This mass is agitated and there are introduced below the surface 100 parts of sulphur trioxide, produced by distilling $SO_3$ from 60% oleum. During the introduction of the $SO_3$ into the mass, the temperature of the sulphonation mass rises to about 125° C. The mass, which has become fairly thick as the reaction proceeds, is heated to about 145° C. with refluxing and held at this temperature for about 3 hours.

The mass is then poured into 1500 parts of water and neutralized with dilute sodium carbonate solution till the aqueous solution becomes alkaline. The aqueous solution containing the sodium salt of the sulphonic acid is separated from the tetrachlorethane layer and acidified with about 174 parts of 20° Bé. hydrochloric acid. To the acid solution there is now added sufficient salt to give approximately a 10% salt solution, whereupon the product separates and after cooling is filtered off. The product is 1:3-di-methyl-4-amino-5-sulpho benzene. Some meta xylidine may be recovered from the tetrachlorethane layer. The tetrachlorethane may be recovered for reuse by well known methods.

*Example II*

One hundred forty-three (143) parts of beta naphthylamine are dissolved in 2000 parts of tetrachlorethane and the mass freed of water by distilling. It is then cooled to about 18° C. At this temperature, 90 parts of sulphur trioxide are added over a period of about one hour. The mass is stirred for about 12 hours and is then heated to reflux and stirred at the reflux temperature for about 2 hours. The mass is then cooled, diluted with 1000 parts of water and made slightly alkaline with about 60 parts of sodium carbonate. The aqueous solution is separated from the tetrachlorethane layer and acidified with about 116 parts of 20° Bé. hydrochloric acid. 200 parts of common salt are now added and the 1-sulpho-2-amino-naphthalene which separates is filtered off. Some beta naphthyl-amine may be recovered from the tetrachlorethane layer.

Other amines such as, for example, para toluidine, para chloro aniline, para bromo aniline and the like may be reacted upon in a similar manner to produce sulphonic acid compounds having the sulphonic acid group in ortho position to the amino group.

Throughout the specification and claims the expressions "para substituted amines", "aromatic amine having the position para to the amino group occupied", "an aromatic amine in which the carbon atom para to the carbon atom to which the amino group is attached has no free hydrogen atom bound thereto" and the like, are used to cover compounds containing a radical, or portion of a radical, other than a hydrogen atom in the position para to the amino group.

We are aware of the fact that various changes may be made in this method of procedure, as for example, that the temperatures, reaction time, and relative amounts of reagents used may be varied, without departing from the spirit of this invention. We therefore do not propose limiting the patent granted hereon other than as necessitated by the prior art.

We claim as our invention:

1. The process of sulphonating an aromatic amino body in which the carbon atom para to the carbon atom to which the amino group is attached has no free hydrogen atom bound thereto, substantially in ortho position to the amino group, which comprises treating the aromatic amino body in which the carbon atom para to the carbon atom to which the amino group is attached has no free hydrogen atom bound thereto in an inert organic solvent with sulphur trioxide.

2. The process of sulphonating an aromatic amino body in which the carbon atom para to the carbon atom to which the amino group is attached has no free hydrogen atom bound thereto, substantially in ortho position to the amino group, which comprises treating the aromatic amino body in which the carbon atom para to the carbon atom to which the amino group is attached has no free hydrogen atom bound thereto in tetrachlorethane with sulphur trioxide.

3. The process of sulphonating an aromatic amino body in which the carbon atom para to the carbon atom to which the amino group is attached has no free hydrogen atom bound thereto, substantially in ortho position to the amino group, which comprises treating the aromatic amino body in which the carbon atom para to the carbon atom to which the amino group is attached has no free hydrogen atom bound thereto in an inert organic solvent with sulphur trioxide and heating the solution to effect sulphonation.

4. The process of sulphonating an aromatic amino body in which the carbon atom para to the carbon atom to which the amino group is attached has no free hydrogen atom bound thereto, substantially in ortho position to the amino group, which comprises treating the aromatic amino body in which the carbon atom para to the carbon atom to which the amino group is attached has no free hydrogen atom bound thereto in tetrachloretane with sulphur trioxide and heating the solution to effect sulphonation.

5. The process of preparing an ortho sulpho amino aromatic compound, in which the carbon atom para to the carbon atom to which the amino group is attached has no free hydrogen atom bound thereto, which comprises treating an amino aromatic compound in which the carbon atom para to the carbon atom to which the amino group is attached has no free hydrogen atom bound thereto in an inert organic solvent therefor, with sulphur trioxide, heating and refluxing the mass until the reaction is substantially complete and recovering the ortho sulpho amino compound.

6. The process of preparting an ortho sulpho amino aromatic compound, in which the carbon atom para to the carbon atom to which the amino group is attached has no free hydrogen atom bound thereto, which comprises treating an amino aromatic compound in which the carbon atom para to the carbon atom to which the amino group is attached has no free hydrogen atom bound thereto in tetrachlorethane with sulfur trioxide, heating and refluxing the mass until the reaction is substantially complete and recovering the ortho sulpho amino compound.

7. The process of preparing an ortho sulpho amino aromatic compound, in which the carbon atom para to the carbon atom to which the amino group is attached has no free hydrogen atom bound thereto, which comprises treating an amino aromatic compound in which the carbon atom para to the carbon atom to which the amino group is attached has no free hydrogen atom bound thereto in tetrachlorethane with sulphur trioxide, heating the mass until the reaction is substantially complete, cooling, diluting, rendering alkaline, separating the aqueous solution formed from the tetrachlorethane, acidifying the aqueous solution and salting out the ortho sulpho amino compound from the acidified solution.

8. The process of preparing 1 : 3-di-methyl-4-amino-5-sulpho benzene, which comprises treating meta xylidine dissolved in tetrachlorethane with sulphur trioxide.

9. The process of preparing 1 : 3-di-methyl-4-amino-5-sulpho benzene, which comprises treating meta xylidine dissolved in tetrachlorethane with sulphur trioxide, and heating the mass to approximately boiling temperatures to effect sulphonation.

10. The process of preparing 1 : 3-di-methyl-4-amino-5-sulpho benzene, which comprises introducing sulphur trioxide into a mass of meta xylidine dissolved in an inert dry organic solvent and heating the mass to effect sulphonation.

11. The process of preparing 1 : 3-di-methyl-4-amino-5-sulpho benzene, which comprises introducing sulphur trioxide into a mass of meta xylidine dissolved in tetrachlorethane and heating the mass under refluxing conditions to effect sulphonation of the metal xylidine to 1 : 3-di-methyl-4-amino-5-sulpho benzene.

12. The process of preparing 1-sulpho-2-amino-naphthalene, which comprises introducing sulphur trioxide into a mass of beta naphthylamine dissolved in an inert dry organic solvent and heating the mass to effect sulphonation.

13. The process of preparing 1-sulpho-2-amino-naphthalene, which comprises introducing sulphur trioxide into a mass of beta naphthylamine dissolved in tetra-chlorethane and heating the mass under refluxing conditions to effect sulphonation of the beta naphthylamine to 1-sulpho-2-amino-naphthalene.

In testimony whereof, we affix our signatures.

ARTHUR R. MURPHY.
JOSEPH B. OESCH.